United States Patent [19]

Curtis

[11] Patent Number: 5,635,023
[45] Date of Patent: Jun. 3, 1997

[54] PROCESS FOR REMOVING TONERS FROM PHOTOCOPY PAPER USING HYDROXAMATE COLLECTORS

[75] Inventor: Jerry L. Curtis, Milledgeville, Ga.

[73] Assignee: Nord Kaolin Company, Jeffersonville, Ga.

[21] Appl. No.: 517,256

[22] Filed: Aug. 21, 1995

[51] Int. Cl.$^6$ .................................................. D21C 5/02
[52] U.S. Cl. .................................................. 162/5; 162/8
[58] Field of Search ................ 162/5, 7, 8; 209/164, 209/166, 168

[56] References Cited

U.S. PATENT DOCUMENTS

| | | | |
|---|---|---|---|
| 3,438,494 | 4/1969 | Fuerstenau et al. | 209/166 |
| 3,920,015 | 11/1975 | Wortham | 128/284 |
| 4,629,556 | 12/1986 | Yoon et al. | 209/166 |
| 4,857,149 | 4/1989 | Tiedeman et al. | 162/158 |
| 5,173,176 | 12/1992 | Klimper et al. | 162/5 |

FOREIGN PATENT DOCUMENTS 030057   10/1981   European Pat. Off. .

OTHER PUBLICATIONS

Doshi, Mahendra, "Recycling of Photocopied and Laser-Printed Papers", Recycled Paper Technology, 1994, pp. 128–131.

*Primary Examiner*—Donald E. Czaja
*Assistant Examiner*—Dean T. Nguyen
*Attorney, Agent, or Firm*—Deveau, Colton & Marquis

[57] ABSTRACT

A flotation process for removing toner particles from photocopied paper which utilizes the following compound as a collector:

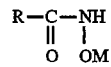

wherein R is an alkyl, aryl, alkylaryl or allyl group having from 4–28 carbon atoms and, preferably from 6–10 carbon atoms, and M represents an alkali metal, or alkaline earth metal radical or a hydrogen atom.

7 Claims, No Drawings

PROCESS FOR REMOVING TONERS FROM PHOTOCOPY PAPER USING HYDROXAMATE COLLECTORS

BACKGROUND OF THE INVENTION

I. Field of the Invention

This invention relates to the use of hydroxamic acid and hydroxamates for collecting toner particles from paper by a froth flotation process.

II. Description of the Prior Art

Froth flotation is regarded as one of the most efficient methods of removing ink particles from recycled mixed office waste. Flotation collectors such as tall oil often require the use of monovalent, divalent, or trivalent cations called "activators". The use of such activators makes the process difficult to control since activators incorporate bi- and multivalent ions which not only contaminate but also prove to be deleterious to collector-fine particle interaction. Therefore it is necessary to maintain a proper balance between the amounts of collector and activator needed. The best solution is to have a collector that performs well in the absence of activators.

Use of hydroxamic acid, a chelating type collector, for removing impurities from kaolin is reported in U.S. Pat. No. 4,629,556 (Yoon, et al.). Yoon's process is used for the removal of colored titaniferous impurities from kaolin clay. Two major impurities in kaolin clay that can be removed by this process are anatase and iron oxides.

U.S. Pat. No. 3,438,494 discloses the use of alkyl or aryl substituted hydroxamic acids or salts thereof as collectors for chrysocolla (U.S. Pat. No. 3,438,494, Fuerstenan et al.).

Hydroxamic acid has been used as an inhibitor of urea decomposition (U.S. Pat. No. 3,920,015; Wortham). Hydroxamic acids have been used as sizing agents in paper formation (U.S. Pat. No. 4,857,149; Tiedeman et al.).

A large quantity of photocopied paper is discarded each year due to the lack of a satisfactory commercial process that can remove the toner particles from the pulp made from this paper. The toner particles are present in the paper made from this pulp which lowers the quality of the paper. These toner particles are hard to remove because the resin and the pigment are fused together onto the paper by the heat applied during the photocopying process.

None of the above references, however, discloses or suggests the use of hydroxamates as collectors for the flotation of toner particles on paper that is designed to be recycled.

SUMMARY OF THE INVENTION

It is an object of this invention to develop a process for removing the toner particles from discarded photocopied paper so the paper can be used for printing purposes, or any other purpose where the whiteness of the paper is important.

It is a further object of this invention to develop a process for removing toners from paper by a flotation process.

These objects have been achieved by this invention.

In accordance with the present invention, there is provided an improved process using flotation technology to clean paper which is to be recycled of toner particles using a collector which can adsorb specifically to the toner ink particles without requiring the use of activators. The process uses as a collector a compound, or a mixture of compounds, having the formula:

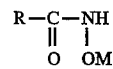

in which R is an alkyl, aryl, alkylaryl, or allyl group having from 4–28 carbon atoms, and preferably from 6–10 carbon atoms, and M represents an alkali metal, or alkaline earth metal radical or a hydrogen atom. Although it is convenient to use the reagents in the form of soluble salts, they can also be used as acids.

It has been found that these reagents are effective collectors for the flotation of toner particles which are very difficult to remove by conventional flotation collectors.

DESCRIPTION OF THE PREFERRED EMBODIMENTS

This invention involves an improved flotation process by which paper to be recycled can be cleaned of toner particles using a collector. This collector specifically adsorbs to the toner particles without requiring the use of activators. The process uses as a collector a compound, or a mixture of compounds, having the formula:

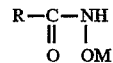

in which R is an alkyl, aryl, alkylaryl, or allyl group having from 4–28 carbon atoms, and preferably from 6–10 carbon atoms, and M represents an alkali metal, or alkaline earth metal radical or hydrogen atom. Although it is convenient to use the reagents in the form of soluble salts, they can also be used as acids.

The hydroxamate collectors can be used effectively at pH values above 6. The amounts of these reagents required for flotation are considerably less than those typically used in the conventional tall oil flotation process. Also, the hydroxamate collectors used in the present invention possess frothing properties, so that no frothers may be necessary for flotation. However, a small amount of frother may be used when a starvation quantity of the collector is used.

The hydroxamate collectors used in the invention can be prepared by reacting free hydroxylamine with the methyl ester of an organic acid of appropriate hydrocarbon chain length and configuration, in a non-aqueous medium such as methanol. For example, potassium octylhydroxamate can be prepared by combining 1.0 mole of potassium hydroxide dissolved in 140 ml of methanol with 0.6 moles of hydroxylamine hydrochloride dissolved in 240 ml of methanol at 40° C. to form free hydroxylamine and potassium chloride precipitate. The precipitate is removed by filtration and 0.33 moles of methyl octanoate is added to the filtrate to precipitate potassium octyl hydroxamate. After the precipitation is complete, the precipitate is recovered by filtration and dried.

Other hydroxamates can be prepared in a similar manner while using a methyl ester of an appropriate organic acid.

In addition to potassium octyl hydroxamate, other hydroxamates which can be made in this manner and which are useful in the process of the invention include potassium butyl hydroxamate, potassium lauryl hydroxamate, potassium 2-ethylhexyl hydroxamate, potassium oleyl hydroxamate, potassium oleyl hydroxamate, potassium phenyl hydroxamate, potassium naphthyl hydroxamate, potassium hexylphenyl hydroxamate, and the corresponding salts of sodium and other alkali or alkaline earth metals. The salts can be converted to the corresponding acids by conventional methods known to those skilled in the art.

Mixtures of different types of hydroxamates can also be used. Hydroxamates can be prepared from coconut oil and will contain a mixture of hydroxamates with eight to ten carbon atoms. Commercially available mixtures are preferred because of their convenience and low cost. Cytec Industries Inc. prepares a commercially available mixture of hydroxamates which sells under the name Aero® 6493.

Nonionic surfactants, such as DI-2000 manufactured by High Point Chemical Co., have been used for some time in froth flotation processes. However, it has been found that these surfactants are not completely satisfactory for removing toner particles from photocopied paper. While these surfactants remove some of the toner particles, they do not remove a sufficient number of toner particles to produce a high quality recycled paper. Tall oil, such as Westvaco tall oil L-5 manufactured by the Westvaco Corporation, has been tried as a collector in flotation processes, but it is not as satisfactory as the nonionic surfactants in removing toner particles. The hydroxamates that are used in the present invention have been shown to remove a large percentage of the toner particles in a flotation process.

The two main photocopying processes that are presently being used are xerography and laser printing. Both of these processes are non-impact in contrast to dot matrix printing. These processes are similar except that the laser printer uses a laser beam as a source of light. Both of these processes use similar toners. These toners are basically composed of a thermoplastic resin and a pigment. A frequently used resin is a copolymer of styrene and butyl acrylate. However, the resin may be a polyester resin or some combination of polyester polymer, styrene acrylic polymer and a polyolefin. Pigments such as carbon black or iron oxide are frequently used. The toners also frequently contain other additives to prevent caking or to control the charge during the photocopying process. In both xerography and laser printing, the toner particles are electronically deposited on a heated drum which melts and fuses the individual small toner particles into a liquid mass. The melted material is transferred by contact to the paper where it is cooled and solidifies into a solid plastic particle which is strongly bonded to the paper fibers. The fusion of the particles and their attachment to the paper make it difficult to remove these particles from paper. Since the particles are essentially small bits of plastic resin, they are chemically inert and resist chemical degradation. This invention involves the development of a process for commercially removing toners from pulp derived from photocopied paper to produce a high quality recycled paper.

As a first step in carrying out the process of the invention, the photocopied paper is first shredded and mixed with water containing sodium silicate. For each 100 grams of paper, 2,500 grams of water and 8 grams of 38% sodium silicate are used. It is preferred that the water be maintained at approximately 90° C. with occasional stirring.

The mixture is then blended in a blender with a chemical collector of this invention added during the stirring. The contents of the blender are then put into a flotation vessel with an impeller. The contents are diluted by adding approximately three times as much water as the mixture and the impeller is run with the air valve closed. The air valve is slowly opened and the resulting foam is controlled by air flow. The toner particles are contained in the accumulated foam which is removed. The paper pulp can then be tested to determine the amount of toner particles remaining.

The hydroxamate collector of this invention adsorbs onto the toner particles in the pulp in a relatively short time, generally not longer than five to ten minutes.

The amount of hydroxamate collector added to the pulp mixture depends on the amount of toner particles present in the paper, the nature of the paper to be processed, and the amount of other reagents used in the process. A smaller quantity of collector may be used if a frother is also used as the collector tends to produce froth. In general, collector additions in the range of 0.05 to 20 pounds per ton of dry pulp, and preferably 0.05 to 6 pounds per ton of dry pulp, will usually be effective.

While it is preferred that the hydroxamates used in this product have an R group of from 6–10 carbon atoms, longer chain alkyl groups can be used but it may be necessary to use a dispersant, such as a soap, in order for the collector to be soluble in water. When the R group has from 6–10 carbon atoms, a dispersing agent is not necessary. Short-chained alkyl groups (i.e., less than 4 carbon atoms) may be too soluble in the water as the collector initially needs to be soluble in the suspension and then becomes insoluble as it collects the toner particles and rises to the surface.

Toner particles can be removed from discarded photocopied paper using the process of this invention. Sufficient toner particles are removed so that the recycled photocopied paper has the desired degree of whiteness and uniformity to be useful for printing and photocopying purposes. The collector used with the process of this invention has the advantage of not significantly decreasing the optical properties of the photocopied paper, which is important in terms of the re-use of this paper for printing or for photocopying. The process of the invention is illustrated in the specific examples which follow.

The above description sets forth the best mode of the invention as known to the inventor at this time, and the following Examples are for illustrative purposes, as it is obvious to one skilled in the art to make modifications to this process without departing from the spirit and scope of the invention and its equivalents as set forth in the appended claims.

EXAMPLE I

Sample 1

A batch of 100 grams of shredded paper that had been copied on a Ricoh FT5733 copier was mixed with 2500 grams of 90° C. water containing 8 grams of 38% sodium silicate and the mixture occasionally stirred with a spatula for ten minutes. The mixture was then put in a large Waring blender (2 gallons) and blended on low speed (80% of output) for 20 seconds. This process was repeated three times, the batches mixed, and cooled to room temperature.

500 grams of the above master batch was put in a small Waring blender (1 quart size) and blended at low speed (80% of output) for 5 minutes. The contents were put in a 2500 ml stainless steel tank with a small urethane open type impeller of a model D-12 laboratory flotation machine. The tank contents were diluted with water to a total weight of 1500 grams and the impeller was lowered into the tank. The impeller was turned on and set to 1000 RPM. The air valve was slowly opened and the foam was controlled by the air. The accumulated foam was skimmed off with a spatula. After four minutes, the material in the tank was removed and the foam discarded. The pulp appeared to have many specks in it. The contents of the tank were strained through a large mesh container to raise the solids of the pulp. The entire pulp was made into a handsheet on a Noble and Wood handsheet former. The handsheet had numerous specks of various sizes. The results are shown in Table I.

Sample 2

One gram of Aero® 6493 was diluted to 10 grams with isopropanol. Aero® 6493 is a mixture of hydroxamates with alkyl radicals of from 8 to 10 carbon atoms. Five hundred grams of the master batch prepared in Sample 1 was put in a Waring blender and 0.1 ml of the diluted Aero®6493 was added and blended for five minutes as set forth in connection with Sample 1. The pulp was processed as in Sample 1 on a D-12 flotation machine. The black toner particles floating in the mixture came off immediately on full air. The foaming stopped approximately four minutes after the foaming started. The pulp appeared to be free of black specks at this time. The pulp was made into a handsheet which had very few small black specks and only one or two medium specks. The results are seen in Table I.

Sample 3

Sample 3 was prepared by the same process as in Sample 2 except that 0.5 ml of diluted Aero® 6493 was used. When the air was turned on, the foam continued long after the black specks stopped being removed. A handsheet, prepared from the pulp, contained a few very small and medium specks. The results are seen in Table I.

Sample 4

One gram of Westvaco L-5 tall oil fatty acids was diluted to 10 grams with isopropanol. This sample was processed in the same way as Sample 2 except that 0.5 ml of diluted tall oil was used in place of the Aero® 6493. This sample foamed slightly more than Sample 1. A large number of small and medium specks were found on the handsheet prepared from the pulp. The results are seen in Table I.

Sample 5

One gram of DI-2000, was diluted to 10 grams with isopropanol. This sample was processed in the same way as Sample 2 except that 0.2 ml of diluted DI-2000 was used in place of Aero® 6493. This sample foamed in much the same way as Sample 1 except that there was a little more foam. A large number of small and medium specks were found on the handsheet prepared from the pulp. The results are seen in Table I.

Sample 6

This experiment was the same as Sample 5 except 0.05 ml of diluted DI-2000 was used instead of 0.2 ml. A large number of specks were found on the handsheet prepared from the pulp. The results are seen in Table I.

TABLE I

Effects of Aero ® 6493, L-5 Tall Oil and DI-2000 on the Optical and Dirt Properties of Hand Sheets Made From Recycled Xerographic Sheets.

| Sample | Collector | #/T** | G.E.* Brightness | HUNTER* L | a | b | Dirt*** |
|---|---|---|---|---|---|---|---|
| 1 | Control | — | 84.3 | 92.0 | 3.00 | 1.07 | 61.3 |
| 2 | Aero ® 6493 | 0.3 | 84.7 | 92.4 | 3.02 | 1.35 | 5.5 |
| 3 | Aero ® 6493 | 1.5 | 83.1 | 92.4 | 3.01 | 2.60 | 2.7 |
| 4 | L-5 Tall Oil | 5 | 84.7 | 92.3 | 3.05 | 1.22 | 37.3 |
| 5 | DI-2000 | 2.0 | 84.5 | 92.8 | 3.54 | 2.08 | 14.2 |
| 6 | DI-2000 | 0.5 | 83.4 | 92.5 | 3.38 | 2.46 | 18.3 |

*G.E. Brightness is the kaolin industry standard measured at 457 nm as compared to magnesium oxide in the 45° directional mode (TAPPI Test Method 452 OM-87) Hunter L,a,b is referenced to TAPPI Test Method T524 OM-86.
**The hydroxamate used in this experiment is 30% pure and pounds per ton is calculated on pure material. The tall oil and DI-2000 are on an "as received" basis.
***Dirt is defined by TAPPI Test Method T437 OM-90 except the values given are dirt particles per square inch.

As can be seen in Table I, the dirt particles are greatly reduced by treatment with Aero® 6493 as compared to the control, tall oil and a nonionic surfactant (DI-2000).

EXAMPLE II

A batch of 100 grams of photocopied paper that had been run through a Hewlett Packard Laserjet 4 Plus printer set on the test pattern (using an HP 92298A toner cartridge) was shredded. The shredded paper was mixed with 2500 grams of 90° C. water containing 8 grams of 38% sodium silicate and the mixture occasionally stirred with a spatula for ten minutes. The mixture was then put in a large Waring blender (two gallon) and blended on low speed (80% of output) for twenty seconds. This process was repeated three times and the batches mixed and cooled to room temperature. This master batch is defined as laser pulp.

Sample 1

Five hundred grams of the laser pulp was put into a regular Waring blender and stirred on a low setting (80% output) for five minutes. The contents were put in a 2500 ml steel tank with a small urethane open type impeller of a model D-12 laboratory flotation machine. The tank contents were diluted to a total weight of 1500 grams and the impeller lowered into tank. The impeller was turned on and set at 1000 RPM. The air valve was slowly opened and the foam was controlled by the air. The accumulated foam was skimmed off with a spatula. After four minutes, the material in the tank was removed and the foam discarded. The contents of the tank were strained through a large mesh container to raise the solids. The entire pulp was made into a handsheet which showed many particles. The results are shown in Table II.

Sample 2

Five hundred grams of the laser pulp was put into a regular Waring blender and stirred on a low setting (80% output). 0.1 ml of a mixture of nine grams isopropanol and 1 gram of Aero® 6493 was added and mixed for five minutes. The contents were put in a 2500 ml steel tank with a small urethane open type impeller of a model D-12 laboratory flotation machine. The tank contents were diluted to a total weight of 1500 grams and the impeller lowered into tank. The impeller was turned on and set to 1000 RPM. The air valve was slowly opened and the foam was controlled by the air. The accumulated foam was skimmed off with a spatula. After four minutes, the material in the tank was removed and the foam discarded. The contents of the tank were strained through a large mesh container to raise the solids. The entire pulp was made into a handsheet which showed fewer dirt particles than control (Sample 1). The results are shown in Table II.

Sample 3

Sample 3 was prepared in the same way as Sample 2 except that 0.5 ml of a mixture of nine grams of isopropanol and one gram of tall oil was added instead of the Aero® 6493. The handsheet made from this sample had more dirt particles in it than Sample 2. The results are shown in Table II.

TABLE II

| Dirt Observed in Laserjet Pulp Derived Handsheets | | | |
|---|---|---|---|
| Sample # | Collector | #/Ton * | Dirt Per Square Inch** |
| 1 | Control | 0 | 81.0 |

TABLE II-continued

| Dirt Observed in Laserjet Pulp Derived Handsheets | | | |
|---|---|---|---|
| Sample # | Collector | #/Ton * | Dirt Per Square Inch** |
| 2 | Aero ® 6493 | 0.3 | 20.8 |
| 3 | L-5 Tall Oil | 5 | 28.7 |

\* The Aero ® 6493 is expressed on a pure basis and the L-5 Tall oil is expressed on an "As Received" basis.
\*\*TAPPI Test Method T437 OM-90

I claim:

1. In a method for removing toner particles from photocopy paper, wherein the paper is placed in a aqueous suspension, and first conditioned by treatment with a collector in an amount sufficient for promoting flotation of said particles and then subjected to froth flotation for removal of said particles from said paper, the improvement comprising using as said collector, a compound having the formula:

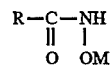

in which R is a group selected from the groups consisting of alkyl, aryl, alkylaryl, and allyl groups of from 4–28 carbon atoms and M is selected from the group consisting of alkali metal and alkaline earth metal radical and hydrogen atoms.

2. The method in accordance with claim 1 wherein R has from 6–10 carbon atoms.

3. The method in accordance with claim 1 wherein M is an alkali metal and R is alkyl group having from 6–10 carbon atoms.

4. The method in accordance with claim 1 wherein said flotation process is carried out in the absence of any additional frothing agent.

5. The method in accordance with claim 1 wherein said suspension contains an effective concentration of a dispersant.

6. The method in accordance with claim 1 wherein the collector is present in an amount from 0.05 to 20 pounds of collector per ton of paper.

7. The method in accordance with claim 1 wherein the collector is present in an amount from 0.05 to 6 pounds of collector per ton of paper.

* * * * *